United States Patent
Eipper et al.

(10) Patent No.: US 6,974,180 B2
(45) Date of Patent: Dec. 13, 2005

(54) ROOF FRAME ARRANGEMENT FOR MOTOR VEHICLES

(75) Inventors: Konrad Eipper, Rottenburg (DE); Heinz Koslowski, Gerlingen (DE); Thomas Lohse, Mechtersen (DE); Thomas Sailer, Metzingen (DE); Matthias Schroeder, Gruenendeich (DE); Roland Wendler, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 17 days.

(21) Appl. No.: 10/469,524

(22) PCT Filed: Feb. 7, 2002

(86) PCT No.: PCT/EP02/01266

§ 371 (c)(1), (2), (4) Date: Feb. 19, 2004

(87) PCT Pub. No.: WO02/070324

PCT Pub. Date: Sep. 12, 2002

(65) Prior Publication Data

US 2004/0124672 A1 Jul. 1, 2004

(30) Foreign Application Priority Data

Mar. 2, 2001 (DE) .......................................... 101 10 057

(51) Int. Cl.[7] .............................................. B62D 25/06
(52) U.S. Cl. ................ 296/210; 296/146.5; 296/146.8; 296/146.9
(58) Field of Search .............................. 296/210, 146.5, 296/146.6, 146.8, 146.9, 146.11, 146.12

(56) References Cited

U.S. PATENT DOCUMENTS

| | | | | |
|---|---|---|---|---|
| 4,568,237 A | * | 2/1986 | Krause et al. | 296/56 |
| 5,081,781 A | * | 1/1992 | Kanyuck et al. | 42/90 |
| 6,478,502 B1 | * | 11/2002 | Yoda et al. | 296/146.8 |
| 2001/0008057 A1 | * | 7/2001 | Sakaue et al. | 296/146.8 |
| 2002/0125741 A1 | * | 9/2002 | Wieschermann et al. | 296/210 |

FOREIGN PATENT DOCUMENTS

| | | |
|---|---|---|
| DE | 10014367 A1 | 9/2001 |
| DE | 10034141 A1 | 1/2002 |
| EP | 1070818 A2 | 1/2001 |

* cited by examiner

Primary Examiner—Lori L. Coletta
(74) Attorney, Agent, or Firm—Crowell & Moring LLP

(57) ABSTRACT

A roof frame arrangement of a motor vehicle has a front, a rear and two lateral roof frames, and a supporting device for a motor vehicle tailgate. The supporting device includes a tailgate hinge and at least one gas-filled compression spring. At least the lateral roof frame contains an inner shell and an outer shell connected to the latter. A hollow space is formed between the inner shell and outer shell. In order to provide a roof frame arrangement having increased stiffness, which can be produced in a simple and space-saving manner and with as few manufacturing tolerances as possible and in which a relatively great outlay on leakproofness is not required, it is proposed to form a rear end region of the lateral roof frame as a single-piece, circumferentially closed hollow profile which encloses the hollow space there and forms a receiving housing in which at least one of the hinge and the gas-filled compression spring is fitted.

15 Claims, 4 Drawing Sheets

ROOF FRAME ARRANGEMENT FOR MOTOR VEHICLES

BACKGROUND AND SUMMARY OF THE INVENTION

This invention relates to a roof frame arrangement of motor vehicles.

In conventional motor vehicles, in particular in "station wagons", the roof frame comprises a multiplicity of individual sheet-metal pressed parts which are joined to form an inner shell and an outer shell which, for their part, are joined, in particular welded, to form a hollow profile with a hollow space. The supporting device for the tailgate which can be pivoted upward is formed by hinges which are fastened at one end to the rear roof frame. In addition, the tailgate is also supported by gas-filled springs which are coupled at one end to the rear post of the bodywork and at the other end directly to the tailgate. In order to ensure the bodywork is leak proof particularly in the end region of the lateral roof frame which is open to the rear in the unfinished state, these shells have to be sealed to the outside in the flange regions in a complex and careful manner. This frequently requires environmentally incompatible sealants. Furthermore, a disadvantage arises with regard to the structural space which is to be provided due to the necessary welding flanges, with relatively large structural spaces being required without substantially increasing the hollow profile cross section which has been produced. Furthermore, the multipart nature and the welding connections, which are affected by distortion, give rise to tolerance problems which, in respect of the connection to the rear roof frame, also hinder the possibility of sealing the arrangement and have the consequence that the roof frame arrangement is complicated to align.

A roof frame arrangement is disclosed in German publication DE-C 27 44 927; in this arrangement, the design of the entire roof frame is not discussed specifically, but the arrangement has a hollow space at the rear end in the upper corners of the flap opening. The hollow space is formed by the sheet metal of the rear post, by the sheet metal of the roof frame and by the roof itself. The supporting device for a tailgate of a motor vehicle is held in this hollow space, and the gas-filled compression spring, which is fastened in a vertically pivotable manner, is connected in a hinged manner to the tailgate hinge.

This invention is based on the object of providing a roof frame arrangement having increased stiffness, which can be produced in a simple and space-saving manner and with as few manufacturing tolerances as possible, and in which a relatively great outlay on leakproofness is not required.

The object is achieved according to the invention.

Owing to the fact that the rear end region of the lateral roof frame, which is open to the rear in the unfinished state, has a single-piece, circumferentially closed hollow profile, the stiffness of the frame is particularly increased in a simple manner in comparison to a shell-type construction. This is of considerable advantage, particularly during a side impact and if the motor vehicle overturns, because of the energy-absorbing effect. Welding flanges are no longer inevitably necessary for production and are no longer of any significance when considering the leakproofness. The absence of gaps and welding flanges means that the hollow profile according to the invention does not allow any leakproofness problems to arise, and it is possible for manufacturing to take place with substantially smaller tolerances than in a multipart shell-type construction. The very great stiffness resulting from the tubular form enables the wall thickness to be reduced with an insignificant reduction in stiffness, which saves structural space and weight. In an advantageous manner with regard to a space-saving and protected possibility of accommodating it, the hollow profile has a receiving housing in which the hinge and/or the gas-filled compression spring is/are fitted. As a blank, the hollow profile may, for example, be an extruded profile or a drawn tube, or may be cut from a billet and welded with a longitudinal seam after a subsequent bending or rolling operation.

In an advantageous development, the hollow profile is held in the hollow space of the roof frame. The shell-type construction then inevitably extends over the entire length of the lateral roof frame. As a result of this, however, the end region has, in conjunction with the held hollow profile, a doubling of the sheet metal, which furnishes the frame with particular stability and stiffness. The hollow profile either can be pushed from the rear with little play into the welded assembly of the shells and then connected to the latter in a suitable manner mechanically, by bonding or welding, or can be tightly encased by the shells of the rear end region of the lateral roof frame, achieving a clamping action. The shells then are welded to one another.

Further expedient refinements of the invention can be gathered from the subclaims; otherwise, the invention is explained in greater detail below with reference to a number of exemplary embodiments illustrated in the drawings.

DETAILED DESCRIPTION OF THE INVENTION

Figure 1:
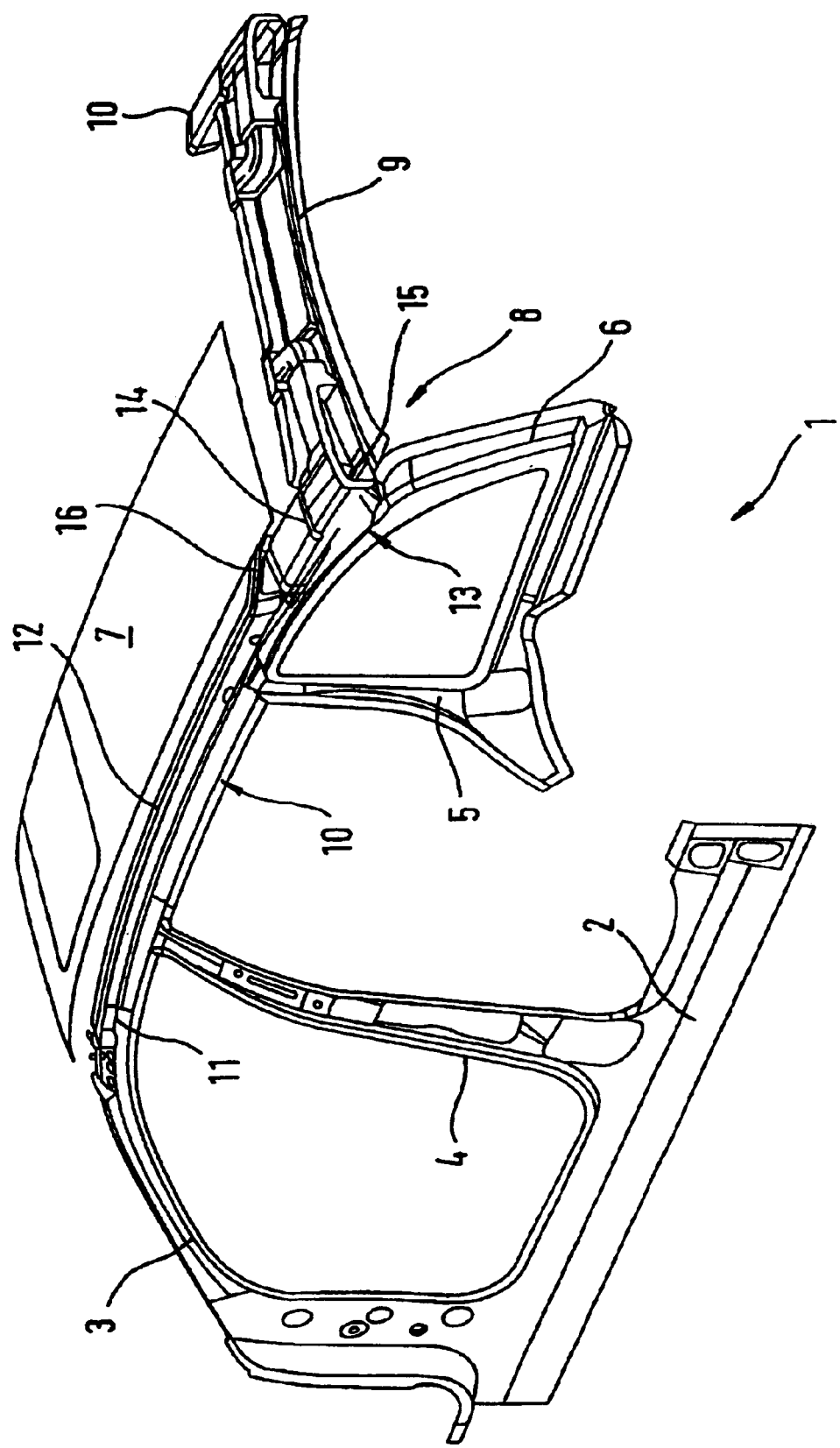
FIG. 1 shows, in a perspective drawing, part of the roof frame arrangement according to the invention with lateral and rear roof frames and a part of a motor vehicle side wall which directly surrounds the side doors frames and side windows.

FIG. 1 illustrates part of a body shell 1 of a motor vehicle, which comprises a side wall 2 with an A-pillar 3, a B-pillar 4, a C-pillar 5 and a D-pillar 6, and a roof 7 and a roof frame arrangement 8. The roof frame arrangement 8 contains a front roof frame (not shown here) and a rear roof frame 9, and also two lateral roof frames 10 (of which the right-hand one can be seen in the drawing only to some extent). The lateral roof frame 10 is formed by an outer shell 11 which, for its part, is at least partially formed by the upper closing regions of the pillars 3–6 and by the connecting webs of the closing regions, and by an inner shell 12 which, connected to the outer shell 11 and the roof 7 by welding, encloses a hollow space, which stiffens the frame 10.

A circumferentially closed hollow profile 14 adjoins the thus formed shell structure of the lateral roof frame 10 toward the vehicle rear as rear end region 13, said hollow profile continuing, by means of its interior space 15, the hollow space of the lateral roof frame 10. The hollow profile 14 rests, on the one hand, on the outer shell 11 and is, on the other hand, enclosed at its front end by a clamping limb 16 of the inner shell 12, said limb protruding toward the vehicle rear. This achieves a particularly good introduction of force into the remaining structure of the body shell in the case of a side impact. In this enclosure, the hollow profile 14 may furthermore be welded or bonded to the outer shell 11 and the clamping limb 16. If a hollow profile 14 of this type is used instead of a shell structure, any welding flanges are rendered superfluous in a simple manner, with the result that the lateral roof frame 10 takes up a smaller structural space there or, if the structural space is used, the cross section of the frame 10 can be increased in accordance with the structural space taken up by the welding flanges, with the stiffness being considerably higher owing to the larger hollow cross section. It should also be emphasized here that the weight of the roof frame is reduced, since the welding flanges are omitted. Moreover, the complicated welding operations of the shell-type construction are no longer necessary in the production of the rear end region 13 of the lateral roof frame 10. Moreover, the multiplicity of parts for the assembly of the roof frame arrangement is advantageously reduced, since the shells of the end region 13 are replaced by a single part—the hollow profile 14.

Figure 2:
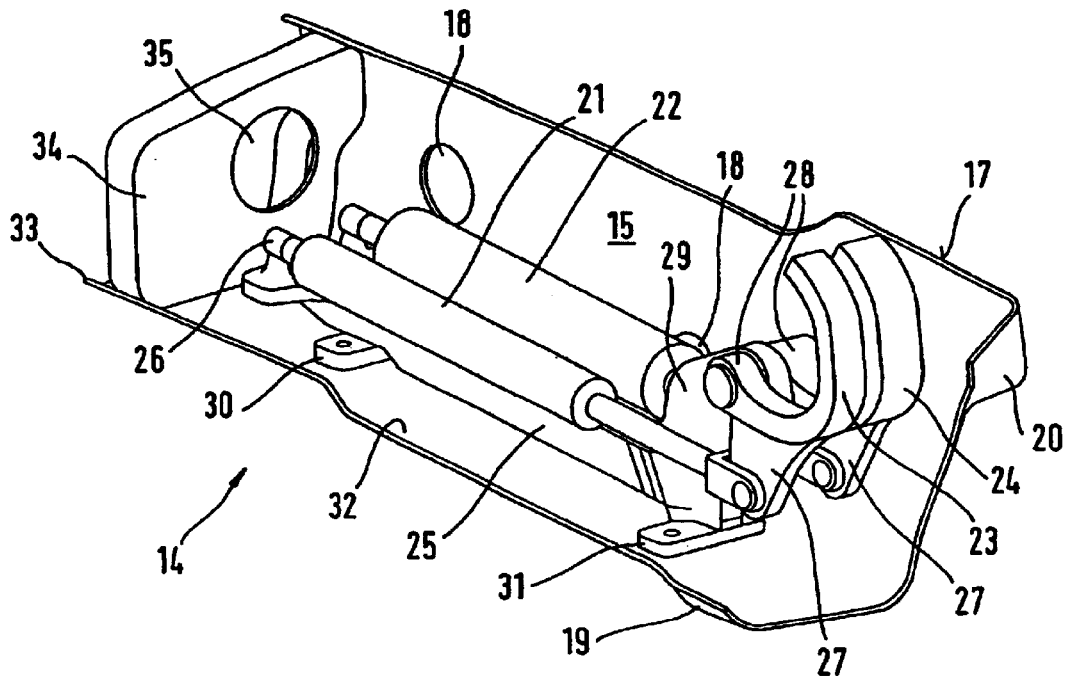
FIG. 2 shows, in a perspective sectional illustration, the hollow profile of a frame arrangement according to the invention from FIG. 1 with the hinge and gas-filled spring fastened in the hollow profile.

The rear roof frame 9, which is formed in a shell-type construction, is attached to the end side of the hollow profile 14. The hollow profile 14 is manufactured from a tubular blank, the blank being pinched from a circular cross section into an approximately rectangular cross section and being placed after the pinching into an internal high-pressure forming mold. In this mold, in which, moreover, the pinching may also be undertaken in an economical manner for the process by means of the closing operation, a fluidic internal high pressure is produced in the interior space 15, which causes the hollow profile 14 to expand and position itself in a manner such that it accurately follows the contours of the mold engraving. Owing to the virtually absent spring-back characteristics of deep-drawn parts and the dimensionally exact formation of the part formed by internal high pressure, a virtually tolerance-free configuration of the rear end region 13 of the lateral roof frame 10 is obtained reliably and in a manner enabling it to be constantly reproduced, as a result of which the sealing problems discussed above are remedied particularly well. In an advantageous manner, during the internal high-pressure forming process, fastening surfaces 17 of virtually any desired shape can be formed in a relatively simple manner as desired from the hollow profile 14, for the purpose of attaching it to the rear roof frame 9 and to the shell structure of the lateral roof frame 10, which structure adjoins the hollow profile 14, as can be seen in FIG. 2. Furthermore, following the forming process, fastening and/or installation holes 18 can be produced economically and in a simple manner in the mold at the existing internal high pressure by means of stamping punches which are integrated in the mold.

In one variant of the hollow profile 14 according to FIG. 2, said hollow profile has, at its rear end 19, a protuberance 20 on the circumference, said protuberance facing the rear roof frame 9, being formed by the internal high-pressure forming process and bearing an essentially planar fastening surface 17 for the fastening of profiles of the rear roof frame 9. Gas-filled compression springs 21 and 22, a rear window hinge 23, which is connected to a rear window which can be pivoted or tilted independently of the tailgate of the motor vehicle, and a tailgate hinge 24 are arranged in the interior space 15 of the hollow profile 14, which forms a spring holder. The gas-filled compression springs 21 and 22 and the hinges 23 and 24 form a compact, space-saving structural unit which is easy to fit, the individual structural components being held on a bearing block 25. The gas-filled compression springs 21 and 22 are fastened to the bearing block 25 by their end 26 remote from the hinge in a manner such that they can only be pivoted vertically, and are coupled to a downwardly pointing hinge lever 27. The claw-shaped hinges 23 and 24 are fitted laterally by means of a lower hinge claw 28 to an upwardly protruding bearing block 29 and are mounted there in a pivotable manner. The bearing block 29 is connected integrally to the bearing block 25 which extends in a strip-like manner and is fixed with a front and a rear foot 30, 31 to the bottom 32 of the hollow profile 14, for example by welding or bonding or—mechanically— by fastening elements, in particular screws. This preassembled structural unit can easily be introduced into the hollow profile 14 and placed at a desired axial position. The fastening or the installation takes place at some point via the mentioned installation holes 18, which are formed on the circumference of the hollow profile 14. A sealing plate 34 is welded and bonded into the hollow profile 14 at the front end 33 in order to prevent moisture from penetrating in the region in which it is connected to the shell structure of the lateral roof frame 10. The sealing plate 34 has an opening 35 through which supply cable strands and/or flexible tubes (not illustrated here) protrude and which is likewise finally closed, like the installation openings 18, by means of a rubber seal.

It is moreover conceivable for a separate bearing block to be assigned instead of a common bearing block 25 to each gas-filled compression spring 21 and 22. Furthermore, the gas-filled compression springs 21 and 22 do not necessarily have to be coupled to the hinges 23 and 24, but rather can be fitted in a moveable manner directly to the tailgate and rear window, respectively.

Figure 3:
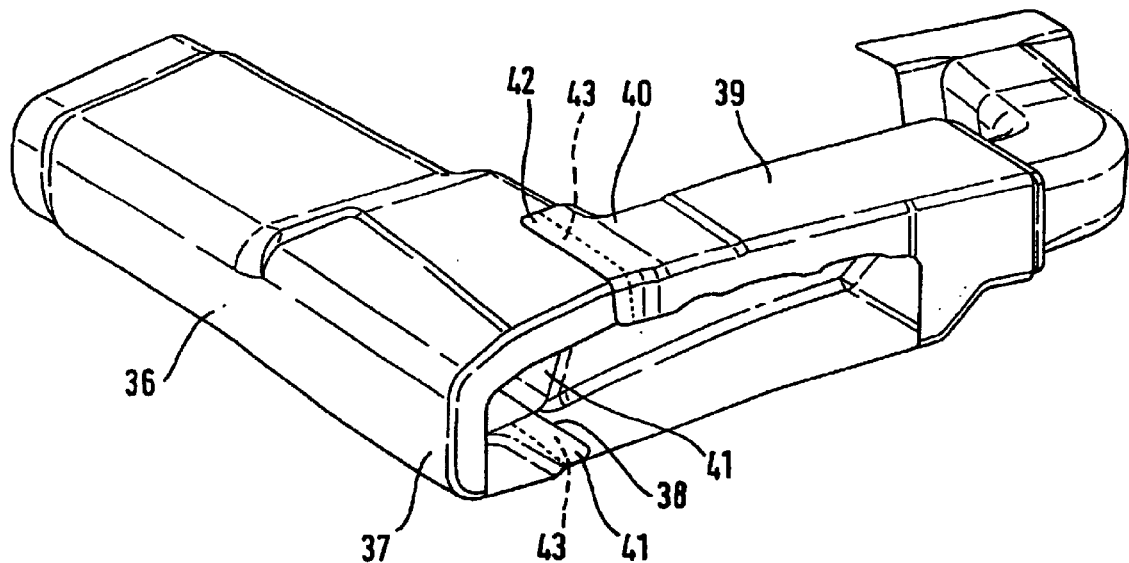
FIG. 3 shows, in a perspective sectional illustration, the hollow profile of the frame arrangement from FIG. 1 without a gas spring and hinge and assembled together with a hollow profile of the rear roof frame.

One variant of the hollow profile 14 just described is shown in FIG. 3. The hollow profile 36 there has, in a favorable manner in terms of connecting techniques, at its rear end 37 in the vicinity of the vehicle rear on the rear roof frame 9, a notch 38 in which a hollow profile 39 of the rear roof frame 9, which hollow profile is preferably likewise produced by internal high-pressure forming, engages by means of its facing end 40, the edges 41 of the notch 38 being encompassed by the hollow profile 39. For this purpose, the hollow profile 39 is turned up on the end side, so that a region 42 in the manner of a welding flange is formed over the entire circumference of the end of the hollow profile and provides, when encompassing the notch edges 41, an overlapping zone 43 in which the two hollow profiles 36 and 39 can be welded, preferably spot-welded, in a manner which is easy to handle. For secure sealing, the hollow profiles 36 and 39 are also bonded there, the bonding process taking place after the welding. The adhesive is applied to the hollow profile 36 directly next to the end of the hollow profile 39, which encompasses it and is already welded, after which the still liquid adhesive is drawn over a wide area into the overlapping zone by means of a capillary effect of the joining gap between the hollow profiles 36 and 39 and can then cure. The weakening of the hollow profile 36 by the notch 38 is more than compensated for in respect of the stiffness at this point by the described, right angled attachment to the hollow profile 39 of the rear roof frame 9. In additon, forces which act from the outside, such as in the case of a side impact, are very readily transferred to the remaining roof frame by being introduced over a large area into the rear roof frame 9, thus achieving high impact resistance.

Figure 4:
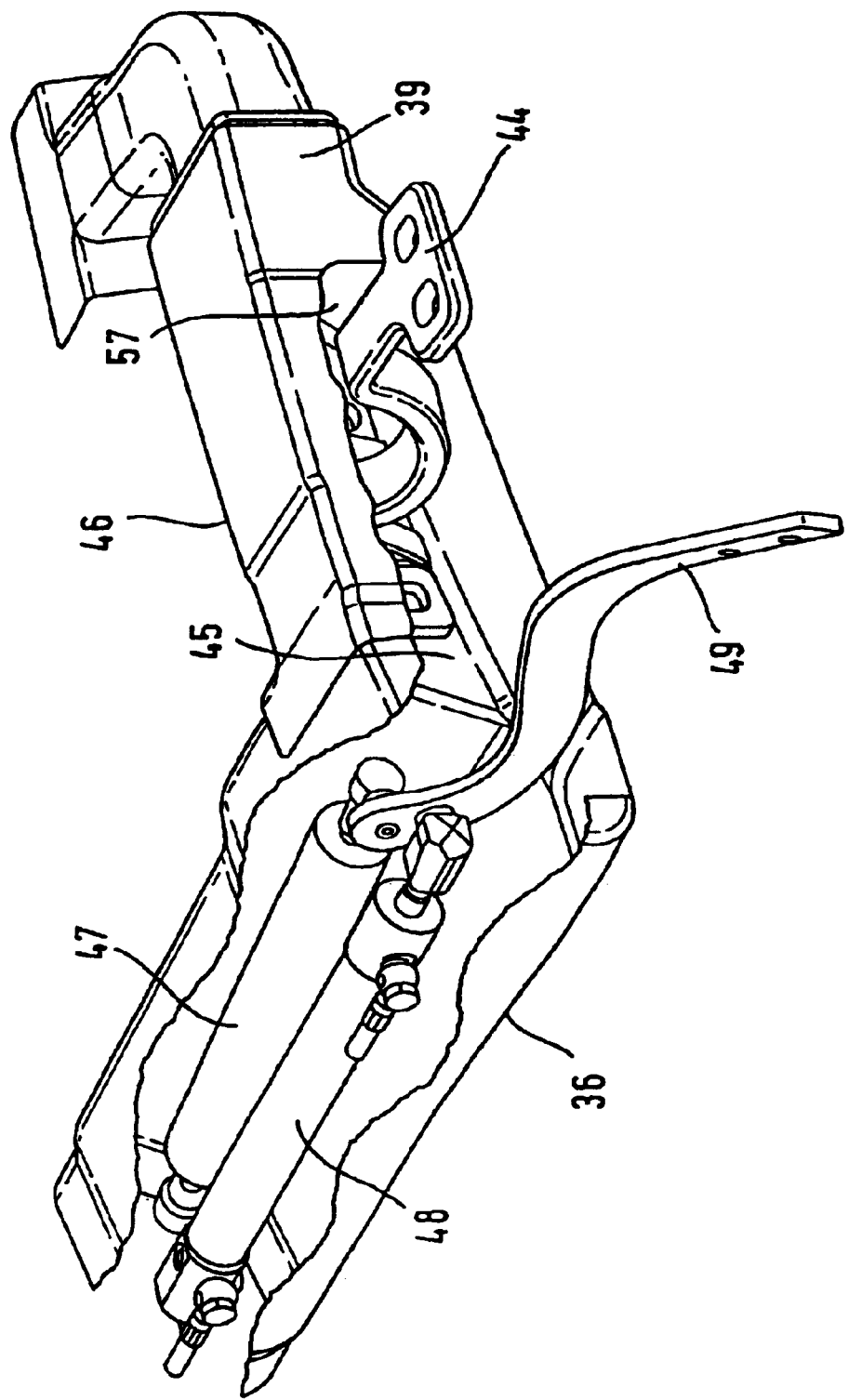
FIG. 4 shows, in a perspective sectional illustration, the hollow profile of the frame arrangement from FIG. 1 with a gas-filled spring and assembled together with a hollow profile of the rear roof frame, which profile contains the hinge.

In FIG. 4, the hollow profile 39 is at least partially open to the rear and in this connection shows a slot 57 which runs horizontally. A tailgate hinge 44, which is fastened in the hollow profile 39 by screwing to the inside 45 of the rear end side 46 of the profile, extends to the side through the slot 57. One gas-filled compression spring 47 operating separately from the hinge and a motor-driven hydraulic cylinder 48—mounted on bearing blocks which are not illustrated more specifically here—are arranged in the hollow profile 36 and, on the one hand, are used automatically and, on the other hand, in a controlled manner to support the tailgate via a lever arm 49. In this case, the hydraulic cylinder 48 may also completely replace the gas-filled compression spring 47. The separation of gas-filled compression spring and hinge enables the roof frame arrangement, in particular the lateral roof frame, to be of narrower construction. After the tailgate is unlocked from the passenger cell, the hydraulic cylinder 48 can be used to pivot up the tailgate in a controlled manner without the risk of injury arising should the flap abruptly spring open.

Figure 5:
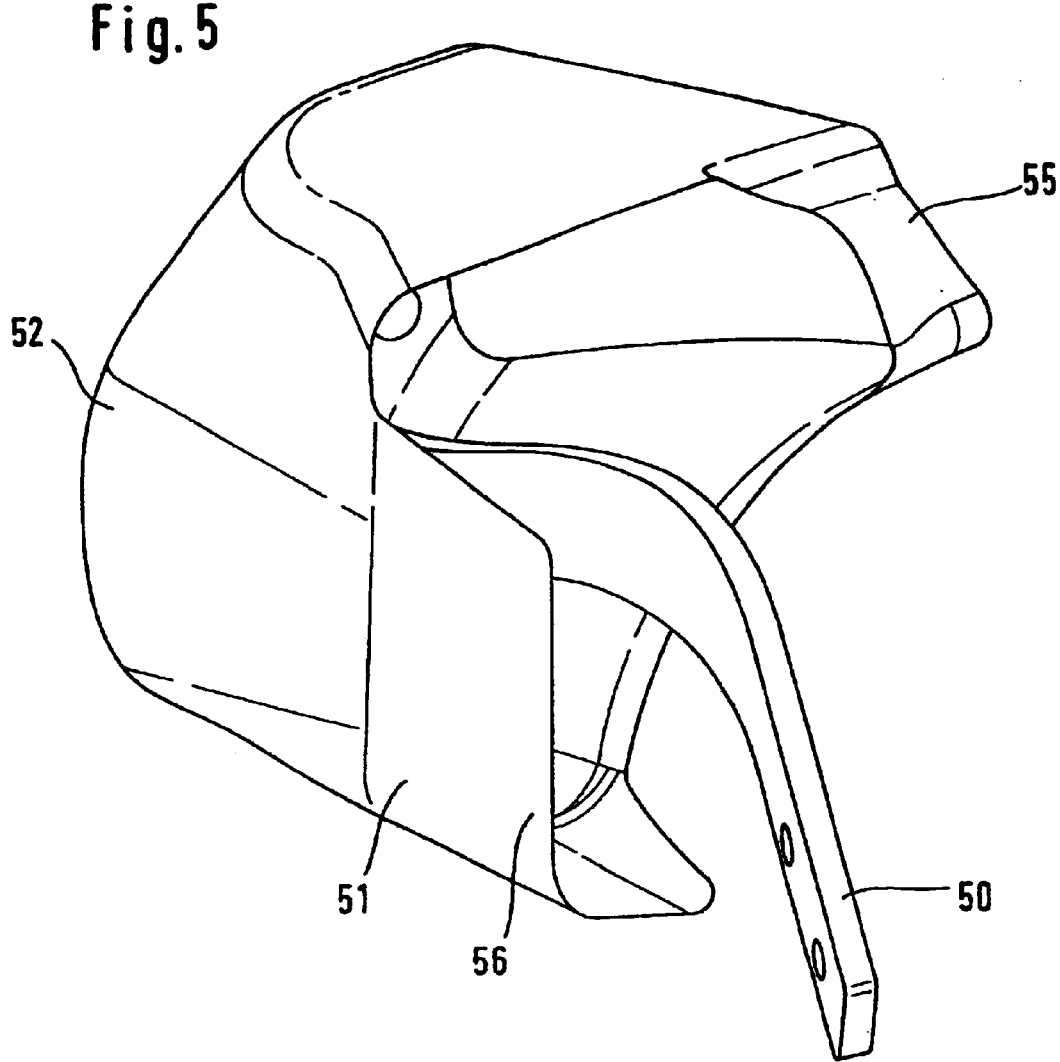
FIG. 5 shows, in a perspective illustration, a hollow profile according to the invention of the lateral roof frame of the frame arrangement in a knee shape with the tailgate hinge fastened and without a gas-filled spring.
Figure 6:
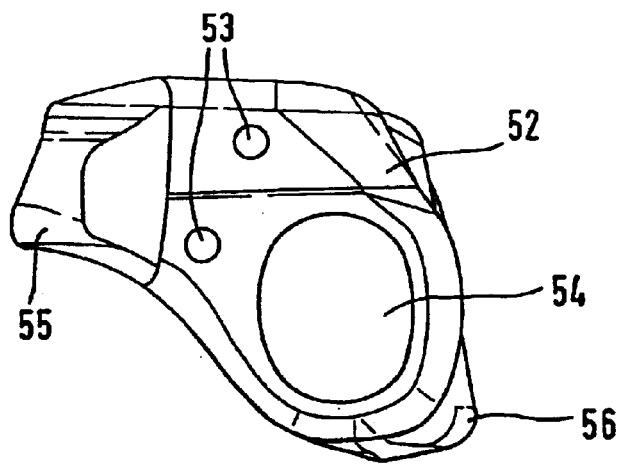
FIG. 6 shows, in a view from the rear, the hollow profile from FIG. 5.

In a further shortened variant according to FIGS. 5 and 6, the tailgate hinge 50 is fitted in the hollow profile 51 at one end. The hinge 50 is, for its part, coupled to a gas-filled compression spring which is arranged in the shell structure of the lateral roof frame 10 which adjoins the hollow profile 51. The hollow profile 51 is bent in the shape of a knee, is then pinched into a polygonal cross sectional structure, preferably within an internal high-pressure forming mold, and is finally expanded by fluidic internal high pressure in accordance with engravings in order to eliminate the sink marks which arise in the process and in order to obtain the desired tolerance-free outer contour. It may, in order to achieve the forming strains, be possible for the expansion to take place in a number of steps interrupted by intermediate annealing. A plurality of openings 53 and 54 are cut out in the knee region 52, two openings 53 (FIG. 6) of which are used for the fastening of the hinge 50. Via the opening 54, the hinge 50 is connected to a piston rod of the gas-filled compression spring, which piston rod protrudes through said opening, after which the opening 54 is sealed by a rubber cap. Whereas the one end 55 of the hollow profile 51 ensures, in a simple manner owing to its natural tube opening, an exact attachment to the rear roof frame 9, the end 56 finally obtains a three-dimensional trim by means of a laser in order to satisfy the tolerance requirements placed on the seal which is to be fastened.

What is claimed is:

1. A roof frame arrangement of a motor vehicle, comprising:
    a rear roof frame,
    two lateral roof frames, and
    a supporting device for a motor vehicle tailgate, said supporting device comprising a tailgate hinge and at least one gas-filled compression spring,
    wherein at least one of the lateral roof frames contains an inner shell and an outer shell connected to the inner shell,
    wherein a hollow space is formed between the inner shell and the outer shell,
    wherein a rear end region of the at least one of the lateral roof frames has a single-piece, circumferentially closed hollow profile which forms a receiving housing, and
    wherein at least one of the hinge and the gas-filled compression spring is fitted in the receiving housing.

2. The roof frame arrangement as claimed in claim 1, wherein the hollow profile is held in the hollow space of the at least one of the lateral roof frames.

3. The roof frame arrangement as claimed in claim 1, wherein the inner shell and the outer shell form a shell structure, wherein the hollow profile adjoins the shell structure as the rear end region, and wherein the rear end region is formed by an interior space of the hollow profile.

4. The roof frame arrangement as claimed in claim 3, wherein the hollow profile is enclosed by a clamping limb of at least one of the inner shell and the outer shell protruding toward a vehicle rear.

5. The roof frame arrangement as claimed in claim 1, wherein the hollow profile is a part formed by internal high pressure.

6. The roof frame arrangement as claimed in claim 1, wherein the inner shell and the outer shell form a shell structure, wherein the tailgate hinge is fitted at one end in the hollow profile and coupled to the gas-filled compression spring, and wherein the gas-filled compression spring is arranged in the shell structure adjoining the hollow profile.

7. The roof frame arrangement as claimed in claim 6, wherein the hollow profile is bent so as to form a knee region, wherein an opening is formed in the knee region, and wherein the gas-filled compression spring is connected to the hinge by way of a piston rod which protrudes through the opening.

8. The roof frame arrangement as claimed in claim 1, wherein the gas-filled compression spring and the tailgate hinge are arranged within the hollow profile, and wherein the gas-filled compression spring is coupled to one end of the hinge.

9. The roof frame arrangement as claimed in claim 8, wherein the gas-filled compression spring and the hinge form a structural unit which is held on a bearing block, wherein the gas-filled compression spring is fastened to the bearing block by its end remote from the hinge in a manner such that it can only be pivoted vertically, wherein the hinge is pivotably mounted at one end on the bearing block, and wherein the bearing block is fixed on the at least one of the lateral roof frames.

10. The roof frame arrangement as claimed in claim 1, wherein a further gas-filled compression spring is arranged in the hollow profile and is coupled to a rear window hinge.

11. The roof frame arrangement as claimed in claim 10, wherein the rear window hinge is separate from the tailgate hinge.

12. The roof frame arrangement as claimed in claim 1, wherein the rear roof frame has a hollow profile which is connected to the hollow profile of the at least one of the lateral roof frames, wherein said hollow profile of the rear roof frame is at least partially open to a vehicle rear and the tailgate hinge is arranged therein, and wherein the gas-filled compression spring is arranged in the hollow profile of the at least one of the lateral roof frames in a manner such that it operates separately from the hinge.

13. The roof frame arrangement as claimed in claim 1, wherein the supporting device contains a motor-driven hydraulic cylinder instead of the gas-filled compression spring.

14. The roof frame arrangement as claimed in claim 1, wherein the hollow profile has, at its rear end, a protuberance oriented toward the rear roof frame and an essentially planar fastening surface for fastening to the rear roof frame.

15. The roof frame arrangement as claimed in claim 1, wherein the circumferentially closed hollow profile has, at its rear end, a notch in which a hollow profile of the rear roof frame engages, and wherein edges of the notch are encompassed by the hollow profile of the rear roof frame and welded there to the hollow profile of the rear roof frame.

* * * * *